Figure 3:
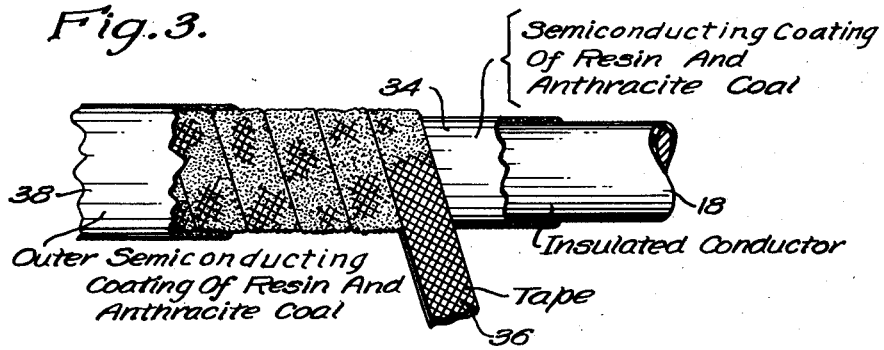

Sept. 23, 1947.   W. B. ATKINSON ET AL   2,427,700
SEMICONDUCTING COATED CONDUCTORS AND SEMICONDUCTING SPACERS THEREFOR
Filed Dec. 3, 1942   2 Sheets-Sheet 1

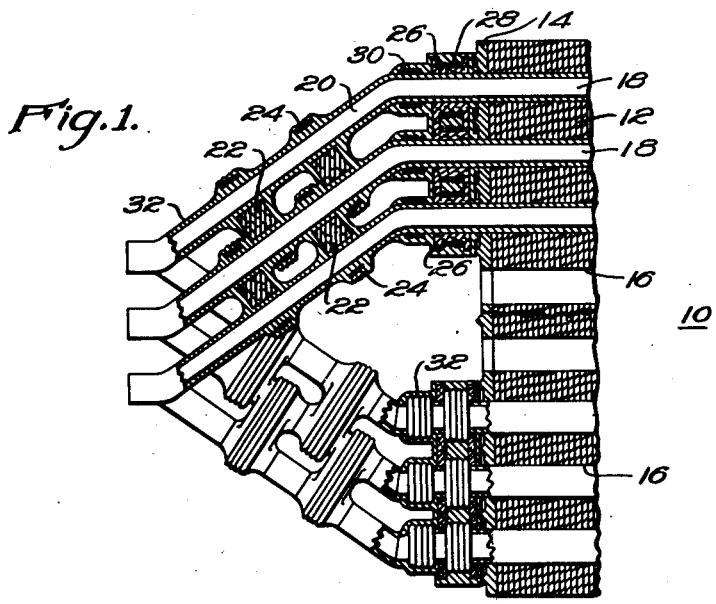

Fig. 1.

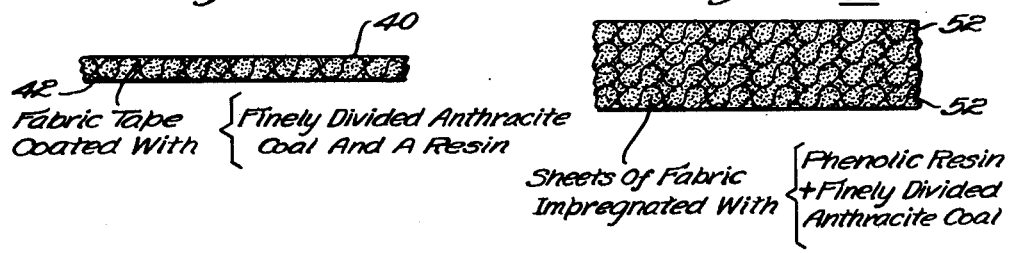

Fig. 2. Fabric Tape Coated With { Finely Divided Anthracite Coal And A Resin

Fig. 4. Sheets Of Fabric Impregnated With { Phenolic Resin + Finely Divided Anthracite Coal

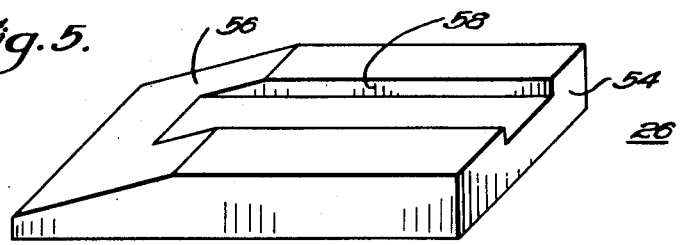

Fig. 5.

WITNESSES:
Robert C. Baird
F. Shapot

INVENTORS.
William B. Atkinson, Lawrence R. Hill and Harry H. Barker.
BY
ATTORNEY Patented Sept. 23, 1947

2,427,700

UNITED STATES PATENT OFFICE 2,427,700

SEMICONDUCTING COATED CONDUCTORS AND SEMICONDUCTING SPACERS THEREFOR

William B. Atkinson, Pittsburgh, Lawrence R. Hill, Wilkinsburg, and Harry H. Barker, Irwin, Pa., assignors to Westinghouse Electric Corporation, East Pittsburgh, Pa., a corporation of Pennsylvania Application December 3, 1942, Serial No. 467,728

10 Claims. (Cl. 174—106)

This invention relates to electrical apparatus including means for preventing corona in high-voltage conductors and other electrical members of the apparatus disposed in air or other gaseous medium. More particularly, this invention relates to molded semiconducting members for use in the electrical apparatus.

The formation of corona in electrical apparatus limits the permissible voltages since the corona tends to destroy organic insulation on high voltage members exposed to air or other gaseous medium. Corona is produced in electrical apparatus when the surface of the electrical insulation thereof exposed to air or other gas is at such electrostatic voltage gradient that the molecules of air or other gas are rendered highly active chemically and electrically. When subjected to these voltage gradients, air, for example, will form ozone, nitrous oxides and other powerful chemical agents that are highly destructive when in contact with organic insulation. Since organic insulation constitutes the major portion of insulation in most present-day electrical apparatus, corona becomes a limiting factor in the permissible voltage employable in the electrical conductors. The use of voltages above the threshold values at which corona is initiated may result in such destructive action upon the organic insulation of conductors that in some cases in only a few months the insulation if all organic may be destroyed or impaired so greatly that it will short circuit and become ineffective for its intended purpose. In cases where the insulation consists of inorganic materials such, for example, as mica, combined with organic insulation, the action of corona on the organic portion may require refinishing at frequent intervals.

It has been proposed heretofore to employ certain resistance compositions available to the trade as a paint for the surfaces of insulation to prevent voltage gradients which would ordinarily lead to the formation of corona. For example, a colloidal suspension of graphite in a vehicle, sold to the trade as Aquadag, has been applied to conductors to produce a semiconducting coating to ground the surface voltage present on the electrical insulation, and thereby the formation of corona was eliminated. When applied closely to the surface of electrical insulation so that there is no air gap between the insulation and the applied semiconducting Aquadag coatings, corona is not formed since the entire surface of the insulation is at very nearly the same relative electrical potential and by grounding the coating, the insulation surface potential to the air is too low to cause ionization of the air. However, corona may form at places where the graphite coating terminates.

Other semiconducting substances, such, for example, as wood chars produced by heat treating wood, at carefully predetermined temperatures, have also been applied as semiconducting coatings to electrical insulation to prevent corona being produced. The advantages of the wood chars over graphite suspensions resides in the higher specific resistivity of the wood chars. For example, Aquadag has a resistivity of the order of 100 to 10,000 ohms per square inch of surface in films of 3 to 4 mils thickness. For insulated conductors carrying 6,600 volts or more, a low resistance does not satisfactorily grade the potential while both low and intermediate resistances cause heavy currents to be carried along the surface of the conductor whereby excessive heat occurs. In such cases, the conductors may become too hot to touch. Excessive heat is just as detrimental to organic insulation as is corona.

It has been found that semiconducting coatings having a resistivity of the order of 1 to 1000 megohms or higher per square of area of films of 3 to 4 mils thickness are sufficient to reduce the electrostatic surface potentials to a non-corona reducing value without excessive current flowing and causing undue heating of the insulation. Wood chars are satisfactory on the score of adequate resistance when combined with a vehicle which, when applied to members, produces adherent coatings having this order of resistivity.

Unfortunately, while heat treated wood chars may have a desirable initial resistivity when incorporated into a vehicle and painted on surfaces, the resistivity is not constant. Wood chars in organic vehicles increase in resistivity at a high rate and in a few years may be of no substantial benefit.

Therefore the requirement for a good corona preventing surface coating is that the resistivity be of the right order when applied and that this resistivity be maintained for prolonged periods of time under operating conditions.

In the copending application of H. H. Barker entitled "Semiconducting material," Serial No. 467,727, and filed copending herewith, which issued as Patent No. 2,397,082, on March 26, 1946, there is disclosed a greatly improved semiconducting coating material comprising anthracite coal for application to the insulation of conductors. It has been discovered that finely divided anthracite coal not only produces coatings of a proper range of resistivity but also maintains its predetermined resistivity of prolonged periods of time and has other desirable properties.

The object of this invention is to provide solid members of a semiconducting nature for use as spacing means and the like in the electrical apparatus.

A further object of the invention is to provide for molding finely divided anthracite coal in combination with a resin and a filler material to produce satisfactory semi-conducting members.

Another object of the invention is to provide for means whereby electrical apparatus is easily and efficiently assembled with semiconducting material present on the surfaces of the electrical insulation whereby corona is prevented.

Other objects of the invention will, in part, be obvious and will, in part, appear hereinafter.

Figure 6:
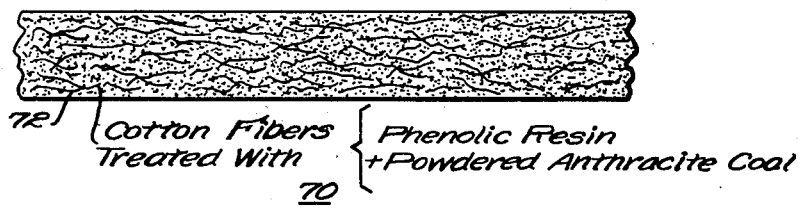
Figure 7:
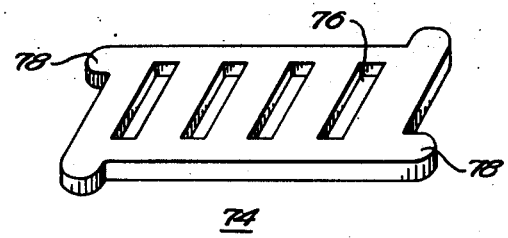

For a better understanding of the nature and objects of the invention, reference should be had to the following drawing, in which:

Figure 1 is a fragmentary view partly in section of the end windings of an electrodynamic machine, Fig. 2 is a greatly enlarged fragmentary cross section of a tape prepared according to the invention, Fig. 3 is a fragmentary view in elevation illustrating a method of applying semiconducting material to conductors, Fig. 4 is a greatly enlarged fragmentary cross section of a molded laminated semiconducting member, Fig. 5 is a view in perspective of a channel spacer block, Fig. 6 is a greatly enlarged view in elevation of a cold molded semiconducting member, and Fig. 7 is a perspective view of a coil spacer member punched out from a sheet of material corresponding to that illustrated in Fig. 6.

In applying semiconducting coatings to the surfaces of electrical insulation on high voltage conductors and other members in order to prevent or reduce corona thereon, it is a problem to apply such material with a reasonable degree of uniformity as well as covering substantially the entire surface exposed to air and other gases. Likewise, the semiconducting coatings should be grounded at numerous places whereby potential gradients of a substantial order are not present as between different surfaces of several adjacent conductors. A further problem arises due to the fact that high-voltage high-efficiency electrical apparatus contains a great number of intimately associated conductors that must be maintained in predetermined position. The several conductors in any given apparatus are usually spaced apart by applying suitable blocking means and the whole rigidly assembled by the use of ties, lashings and tape in order to prevent vibration and stresses set up by the powerful magnetic fields from doing injury to the several conductors.

Referring now to the drawing, and Fig. 1 in particular, there is illustrated the fragmentary cross sectional view of a generator 10 showing a portion of the slot fitting coils 18 and the end windings 20 thereof. The slot fitting coils 18 are embedded into slots 16 in the laminations of magnetic material 12, the laminations being held in position by end plates 14 and the like. The end windings 20 are blocked or spaced apart by blocks or spacers 22 applied at positions selected for maximum strength. Ties or lashings 24 are applied at positions adjacent to the blocks 22. The coils 18 at the point of their emergence from the slots 16 are blocked apart by channel blocks 26 and secured by ties or lashings 28 while additional cross lashings 30 are employed at a point just beyond the channel blocks 26. The conductor coils and end windings 18 and 20 are coated with a semiconducting composition that produces a semiconducting coating 32, which is preferably applied prior to assembling the coils in the apparatus 10. The portion 18 is coated with a low resistance graphite composition in addition. A more uniform and satisfactory surface application may be made on the individual coils prior to assembly than when a great number of coils have been assembled in the apparatus due to the fact that the coils are normally spaced so closely together that they form a close grid or arrangement with relatively small spaces in between.

The cross connectors and rings (not shown) by means of which the coil leads are interconnected and the electrical current made available to external conductors also are provided with a semiconducting coating to eliminate corona.

While the potential on the surface of any single end winding 20 may be graded by the semiconducting coating 22, it has been found that the several end windings should be electrically connected in semiconducting relation and grounded in order to make certain that the electrostatic potential or the air between them does not become sufficient to cause corona. For this reason, it is desirable to make the entire blocks 22 and 26 semiconducting as well as the lashings or ties 24, 28 and 30. The low resistivity graphite coating on 18 will grade the potential to nearly ground values.

It has been discovered that great difficulties attend in the application of semiconducting compositions to the various windings and members in building up the apparatus 10 unless the members have been made with or treated to provide for semiconducting properties prior to assembly. Accordingly, for use as lashings or ties at 24, 28 and 30, flexible tapes or lashings or the like, of a semiconducting nature, may be prepared beforehand and upon simply taping the end windings with such tapes or lashings, a satisfactory semiconducting contact is obtained without painting with a semiconducting composition being required after assembly.

Referring to Fig. 2 of the drawing, a tape 40 having semiconducting properties is illustrated. The tape 40 comprises a body of fabric 42, for example, glass fabric, asbestos or cotton or combinations thereof. The fabric tape 42 is treated with a composition containing a film forming organic resin dissolved in a suitable solvent and finely divided anthracite coal distributed therein. The composition may be applied to the tape by dipping, brushing, spraying or other suitable method and dried. It will be apparent that cord or string prepared from similar fibrous materials may be treated in the same way to produce lashing material.

The method of application of semiconducting composition to the windings 18—20 is shown in greater detail in Fig. 3 of the drawings. The insulated conductor 18, shown schematically as a single insulated conductor, is treated by applying a uniform coating 34 of semiconducting composition. This will consist of finely divided anthracite coal carried by an organic film forming vehicle. While still wet, an untreated porous fabric tape 36 of glass fiber, cotton or asbestos, for example, is tightly wound about the painted conductor to cause the composition to penetrate into the fabric and ooze through the interstices thereof. An outer coating of semiconducting composition 38 is then applied over the entire tape.

The combination of two semiconducting coatings and the porous tape is suggested for obtaining the most durable and lasting semiconducting surface coatings for insulated conductors. Windings 18—20 so treated can be assembled into slots, tied with lashings and handled freely without the semiconducting coating being knocked off easily. The degree of protection is high and the life under most conditions is excellent.

In case thinner coatings of semiconducting composition are required one or two layers of the composition alone may be brushed or sprayed on. Care in applying this last type of treatment will be required and care in handling members so treated is also necessary. Dipping in semiconducting compositions is not recommended for usual purposes, since a relatively non-uniform coating will result.

In producing the composition to be applied to the conductors 18—20 and tape 42, it has been found that anthracite coal has unexpected advantages over graphite and other carbonaceous materials employed heretofore. For example, graphite is relatively highly electrically conducting and in order to secure a resistivity of 1 megohm or higher per square of 3 to 4 mils thick film such small quantities of graphite must be employed that small errors in the amount of graphite added entail enormous variations in electrical resistance. Furthermore, in applying compositions containing such small quantities of graphite, not only do small differences in thickness result in large differences in resistivity, but the resulting coating is somewhat unstable and subject to serious deterioration from wear and natural causes. Anthracite coal, on the other hand, may be obtained from several sources with such a resistivity that when made into a composition containing about 20% to 90% coal and 80% to 10% resin, the resistivity of a 10 mil film is very closely related to that desired for highly satisfactory semiconducting coatings. The following table indicates the electrical resistivity of six samples of Pennsylvania anthracite coal, the dry powdered coal being measured in a conductivity cell, and shows the correlation of resistivity to percent of volatile matter.

TABLE I

| Sample No.— | Percent Vol. Matter | Electrical Resistance |
|---|---|---|
| | | As rec'd. 20 mesh. |
| 1 | 2.9 | .009 megs. |
| 2 | 3.1 | .009. |
| 3 | 4.9 | .23. |
| 4 | 6.4 | .38. |
| 5 | 6.7 | 1.4. |
| 6 | 7.7 | 7.6. |

The electrical resistivity of the several powdered anthracite coals in Table I is not the resistivity which will obtain when the anthracite coal is suitably treated and incorporated in organic film forming materials employed as a vehicle therefor. However, the resistivity of the final coating or film will vary almost directly with that indicated in the tables but the values will be of entirely different order.

The compositions of this invention are composed of natural anthracite coal. By natural anthracite coal it is intended to mean anthracite coal that has not been subjected to any decomposition processes, such as would reduce the volatile content, except mechanical operations to reduce it to proper particle size for use in semiconducting coatings.

Anthracite coal of a high grade may be purchased crushed to No. 5 buckwheat size. The anthracite coal is prepared by initially blending two or more available anthracite coals to secure a proper resistivity material as determined by experience unless it happens that one type of coal is of just the right resistivity. The anthracite coal may be ground initially to 100 mesh or finer, but this is not necessary. A semiconducting composition is prepared from the ground anthracite coal by incorporating a predetermined quantity of anthracite coal in a solution of a suitable organic film-forming material such as an insulating varnish. For example, one part of coal and two parts of a linseed oil modified glycerol phthalate resin dissolved in two parts, petroleum spirits, or other suitable solvent, is one suggested combination. Four parts of coal and one part of gum arabic is another combination. Numerous resins and film-forming substances may be used as vehicles. Their selection depends on stability at operating temperatures, adherence to surfaces, hardness or toughness, ease of painting and other requirements. The anthracite coal and a solvent for the resin or a prepared resin varnish are milled in a ball mill, tube mill or the equivalent for a period of time from two to twenty-four hours until a substantial proportion of the coal is of colloidal fineness. If the resin has not been added initially, it should be added to the coal and milled for at least a half hour since it has been found that incorporation of the anthracite pigment into the organic film-forming material by conjoint milling is necessary in order to secure desirable coating properties, such as uniformity of electrical resistance.

Numerous kinds of apparatus may be used to reduce the anthracite coal to substantially colloidal dimensions. Ball mills, tube mills and similar devices are suitable for the purpose. By "milling" we refer to the use of such devices generally capable of producing particles of one micron or less in size.

Tape made by applying a composition prepared in this manner from anthracite coal has highly stable resistivity values over a prolonged period of time, even under accelerated ageing conditions. The following table is typical of the results which have been obtained:

TABLE II

*Ageing of Tape*

[Megohms/sq. in.—10 mil thick tape]

| | Pigment | Resin | Days at 200° C. | | | | | | | | |
|---|---|---|---|---|---|---|---|---|---|---|---|
| | | | 5 | 6 | 7 | 9 | 12 | 16 | 19 | 25 | 50 |
| 5 | Beech char in.... | oil modified glycerol-phthalate. | 120 | 135 | 155 | 270 | 210 | 440 | 700 | 1,740 | 16,000 |
| 7 | Anthracite Coal in. | Coumarone resin... | 18 | -------- | 11.4 | -------- | 15½ | 15 | 17½ | -------- | 22 |
| 24 | 50/50 Anthracite Coal-Beech char. | .....do............. | 9.3 | -------- | 8.4 | -------- | 10.5 | 11.7 | 17 | -------- | 43 |
| 26 | Anthracite Coal. | .....do............. | 1.4 | -------- | 1.1 | -------- | 1.1 | 1.0 | 1.1 | -------- | 1.6 |
| 31 | Anthracite Coal (1½ parts). | Asphalt (1 part)... | 16½ | -------- | 14½ | -------- | 15 | 14 | 17½ | -------- | 21 |

In examining the table, it will be noted that beech char coated tape, test No. 5, had an initial resistivity at five days of 120 megohms per square and after fifty days the resistivity had gone up to 16,000 megohms. This last value is entirely too high for the purpose of preventing corona by reducing surface potentials since 1000 megohms is about the upper useful limit. By comparison the anthracite coal under tests Nos. 7, 26 and 31 in the table, shows an insignificant increase in resistance over the same ageing period. The anthracite coal even confers some stabilizing benefits on compositions containing beechwood char as shown in test No. 24 of the table where the resistance of 50% beechwood char, 50% anthracite coal coating increased only a moderate amount over the ageing period. It is believed from comparative tests that this 50 day test at 200° C. is equivalent to nearly 10 years at 100° C.

In assembling the dynamoelectric apparatus of the type shown in Fig. 1, it is desirable to employ blocks of semiconducting material throughout in preference to blocks of wood or other relatively insulating material coated with a semiconducting composition. Wood or fiber blocks show high shrinkage thereby impairing the electrical contact as well as the degree of support. The coated blocks may be subject to chipping and other abuse which may result in mechanical failure of the painted coating and consequently the blocks will not function as semiconducting spacers as intended. Other advantages of all semiconducting members have been found in practice.

It has been discovered that anthracite coal may be incorporated into molded members in such a way that the members are semiconducting throughout. Anthracite coal has proven not entirely satisfactory when simply added to a resin varnish and applied to a fibrous filler material and molded since the resistance is neither uniform nor entirely predictable. To obtain molded members of high strength from the mechanical viewpoint as well as highly uniform and effective electrical semiconductors, the following process of preparation has been found most suitable.

In preparing laminated material, a solution of a thermosetting resin, for example, a phenol formaldehyde resin in the "A" stage dissolved in a suitable solvent, is combined with pulverized anthracite coal. From 0.5 to 1.5 parts of anthracite coal to each part of solid resin produces good results. For practical purposes equal amounts of resin and anthracite coal are satisfactory. The resin and anthracite coal are ball milled for a period of time ranging from 2 to 24 hours in order to produce a highly uniform and intimate distributed mixture. One convenient way of determining whether the ball milling has been carried out for a sufficient length of time is to take a sample of the mixture in the ball mill and dilute with a suitable solvent for the resin, for example, acetone, to a concentration of 0.035% dispersion of anthracite coal pigment. The dispersion of coal is put into the sampling tube of a photoelectric colorimeter and a 5% light transmission indicates that the average particle size is of the order of 1 micron. It has been the experience that at this degree of light transmission the ball milling has been carried out to a sufficient degree. Light transmission values of ¼% to 10% may be selected at suitable indications of a sufficient degree of comminution of the coal. The coal will be of a substantially colloidal fineness.

The properly ball milled anthracite coal in the resin solution is diluted to a consistency usual for impregnation at about 65 seconds No. 1 Demmler viscosity at 20° C. by utilizing equal mixtures of alcohol and acetone or their equivalent. The solution may be employed to impregnate cloth or other sheet fibrous material in standard phenol formaldehyde treating towers. It has been found for good bond results as well as satisfactory semiconducting characteristics sufficient resin and coal should be applied to the fabric to increase the weight of the fabric 60% to 100%. The fabric so treated may then be cut into shape and a plurality of sheets molded in a hot press at a pressure of the order of 1,000 to 5,000 pounds per square inch at 160° for 15 to 40 minutes and cooled. It will be obvious that other temperatures and pressures may be employed in molding the fabric. The resultant molding is shown in a greatly enlarged cross section in Fig. 4 of the drawing at 50. The several sheets of fabric 52 coated with phenolic resin and the finely divided anthracite coal will be found to be bonded into a strong and durable member that will be of suitable electrical resistance.

For the purpose of spacing end windings and similar conductors in apparatus, the electrical resistance of the molded members should be of the order of from 0.001 to 10 megohms per cubic inch. Since it is possible to vary the proportion of anthracite coal to the solid resin as well as the amount of resin and coal to the weight of the fabric to which it is applied, no specific manufacturing instructions as to quantities for specific results can be given. However, for a given blend of anthracite coal, when equal parts of coal and resin were combined and applied to a fabric in an amount equaling 60% of the weight of the fabric, the resistance was approximately two megohms per cubic inch. When the proportion of coal was 1/10 the weight of the resin and the same weight of resin and coal was applied to fabric, the resistance was .8 megohm per cubic inch. The following specific example is typical of the results. Asbestos cloth was impregnated with a solution prepared by ball milling 29.7 parts powdered anthracite coal, 37.4 parts of cresol formaldehyde resin and 32.9 parts acetone. The asbestos cloth increased in weight equal to 70% of its initial weight after passing through drying towers. The molded material was prepared in several thicknesses as follows:

TABLE III

| Thickness inches | .064 | .128 | .387 |
|---|---|---|---|
| Megs. Resistance/sq. in | .05 | .12 | .22 |
| No. of Laminations | 2 | 4 | 12 |

Blocks of a shape similar to members 26 of Fig. 1 were prepared from material similar to 50 and machined to the shape illustrated in Fig. 5. The block 54 was machined to provide a wedge-shaped end 56 and milled in a milling machine to provide a channel 58. The blocks were a suitable thickness for hammering between coils 18 and 20 as shown in Fig. 1. Other shaped members may be produced by machining to suit the requirements of individual installations. Blocks of a rectangular cross section suitable for use at 22 may be produced simply by cutting a large sheet with a saw or a milling cutter.

Molded semiconducting members which can be punched to predetermined shape may be produced by an alternative procedure. Cotton fibers, sawdust, paper pulp or wood flour or other loose filler material suitable for incorporating in molded members may be mixed in a Banbury mixer with from 0.5 to 1.5 parts of powdered anthracite coal. After thoroughly mixing the two, phenol formaldehyde resin in solution or other thermosetting resin is slowly introduced into the mixer, the mixer being operated until substantially an intimate mixture of anthracite coal resin and filler effected. The mixture will be of a doughy, agglomerated nature and it is dried in shallow pans upon removing from the mixer. In order to secure predetermined electrical properties the dried mixture is put within a ball mill and subjected to ball milling for a period of one-half hour which is sufficient to finely comminute the mixture without causing incipient fusion which will result in polymerization of the resin and other materials. The ball milled powder may be placed in hot molds with or without a plasticizer such, for example, as diamyl phthalate, and on molding at pressures of the order of 1000 to 5000 pounds per square inch at 130° to 180° C., a boardlike sheet of material is produced. The molded sheet can be machined or punched readily when prewarmed to about from 80° C. to 120° C. When cold, the moldings can be cut with saws and the like or turned on a lathe.

Referring to Fig. 6 of the drawing, a molded sheet 70 as may be produced by following this process is shown in greatly enlarged cross sectional view. The cotton fibers 72 in the molded sheet are intimately distributed and bonded by the phenolic resin carrying the distribution of powdered anthracite coal. A typical punching which has been prepared from the sheet 70 is the spacer 74 illustrated in Fig. 7. The spacer 74 contains a plurality of small punched perforations 76 approximately one-eighth inch by half inch in length and a plurality of rounded projections 78 at the corners of the spacer. It will be understood that the resistance and strength of the molded members illustrated in Figs. 6 and 7 will vary with the type of filler, the amount of anthracite coal and the amount of resin. Moldings prepared from 30% to 50% anthracite coal, 30% to 50% resin and from 10% to 50% filler will be found suitable for the purpose of the invention, however these proportions may be departed from in prepared members for some purposes. Resistances varying from 0.01 megohm per cubic inch up to 100 megohms per cubic inch may be readily attained by varying the proportions of a molding mixture within this range.

The molded members may be given semiconducting properties by the introducing anthracite coal alone, or a mixture of anthracite coal and a wood char or other carbonaceous material. A 50% wood char, 50% anthracite coal molding will not be of as constant resistance as the all anthracite coal pigment molding, but for some purposes it may still be satisfactory.

The advantages of the semiconducting members of Figs. 5 and 7 reside in the fact that the semiconducting properties are permanent and an integral part of the substance of the members whereby inadvertent abuse will not cause very appreciable variations in resistance as would occur with a painted coating. The shrinkage of such solid members is low and the end windings will be adequately supported while in use. The semiconducting members may be applied easily and efficiently to the end windings at places where necessary. The members may be hammered or pounded into place with whatever force is necessary to secure a proper fit. Furthermore, by the use of such previously prepared semiconducting members, the various connections need not be treated with semiconducting paint after assembly of the apparatus. It should be mentioned that for practical purposes, it is required that the semiconducting coatings and members applied to end windings should have a reasonably uniform electrical resistivity with a variation of not more than 20% to 40% over all surfaces. It would be extremely difficult to paint by hand end windings after assembly and secure anywheres near this uniformity. Differences in coating thickness due to spreading difficulties, dripping, and other factors will readily exceed this order of values. Numerous laminated semiconducting members and molded electrical members have been aged for prolonged periods of time with substantially small changes in resistivity of the members with time. Even after several months, at 100° C. the change in resistivity is well within the errors of testing. Accordingly, the molded members are highly stable. By comparison, laminated semiconducting members prepared with only a coating of a composition of wood char on their surfaces relatively rapidly changed in resistivity with time and in several months testing the resistivity increased many fold.

After assembling the windings 18, spacers 22—26, and lashings 24, 28, 30, as shown in Fig. 10, the entire apparatus may be coated with a heavy protective, weather resisting enamel or paint. Electrical contact between the semi-conducting composition on the windings, the semiconducting spacer blocks and the semiconducting lashings with each other will not be adversely affected by this treatment.

In some cases slots 16 may be independently covered with a low resistivity graphite suspension to reduce corona in or at the laminations. This low resistance coating will assist in grading the potential along the windings 20.

Since certain obvious changes may be made in the above procedures and different embodiments of the invention could be made without departing from the scope thereof, it is intended that all matter contained in the above description or taken in connection with the accompanying drawings, shall be interpreted as illustrative and not in a limiting sense.

We claim as our invention:

1. A molded electrically semiconducting member suitable for use in spacing high voltage electrical members, comprising, a fibrous base material, a resin impregnating the fibrous base material, and a distribution of natural anthracite coal of substantially colloidal fineness having less than 10% volatile matter in an amount sufficient to provide for predetermined electrical resistance of the order of 0.001 to 10 megohms per cubic inch, the resin bonding the whole into predetermined shape.

2. A molded electrically semiconducting member suitable for use in spacing high voltage electrical members, comprising, a fibrous base material, a thermosetting resin impregnating the fibrous base material, and a distribution of finely pulverized natural anthracite coal having less than 10% volatile matter, the coal derived by milling the coal and resin solution to a predetermined extent, the anthracite coal being in an amount sufficient to provide for predetermined electrical resistance of the order of 0.001 to 10 megohms per cubic inch, the thermosetting resin bonding the whole into predetermined shape.

3. A molded electrically semiconducting member suitable for use in spacing high voltage electrical members, comprising, a fibrous base material, from 85 to 10 parts of resin impregnating the fibrous base material, and a distribution from 15 to 90 parts of finely pulverized natural anthracite coal having less than 10% volatile matter in the resin to provide for predetermined electrical resistance of the order 0.001 to 10 megohms per cubic inch, the resin bonding the whole into predetermined shape.

4. In the method of preparing molded electrically semiconducting members from a thermosetting resin and pulverized natural anthracite coal having less than 10% volatile matter applied to a filler, the step of milling the natural anthracite coal to substantially colloidal fineness with the resin dissolved in a solvent to produce a varnish for a period of time to provide for uniform distribution and adequate electrical resistivity.

5. In the method of preparing molded electrically semiconducting members from a thermosetting resin and pulverized natural anthracite coal having less than 10% volatile matter applied to a filler, the step of milling from about one to three parts of natural anthracite coal to substantially colloidal fineness with one part of the resin dissolved in a solvent to produce a varnish for a period of time to provide for uniform distribution and adequate electrical resistivity.

6. In the process of preparing molded electrically semiconducting members from a thermosetting resin and natural anthracite coal having less than 10% volatile matter, the steps of mixing a filler material and finely pulverized natural anthracite coal to produce a homogeneous mixture, adding a solution of the thermosetting resin to the mixture and continuing mixing, drying the mixture until the resin solvent substantially evaporates, and milling the resultant product for a period of time sufficient to comminute it into a fine powder, but insufficient to cause agglomeration of the resin, anthracite coal and filler.

7. A molded electrically semiconducting member suitable for use in spacing high voltage electrical members, comprising, sheets of fibrous material, a thermosetting resin applied to the sheets of fibrous material and a finely divided semiconducting pigment including a major proportion of natural anthracite coal having less than 10% volatile matter embodied in the resin as an intimate and uniform distribution of from about one to three parts of the pigment of substantially colloidal fineness with one part of resin, the sheets of fibrous material being consolidated into the member.

8. In high voltage electrical members operating in a gaseous medium including electrical insulation on the members and a semiconducting coating applied to the electrical insulation to reduce the generation of corona, a plurality of semiconducting members applied to the electrical members in contact with the semiconducting coating for semiconductingly spacing the electrical members with respect to one another in the gaseous medium and grading the electrical potential on the surface of the several electrical members to values below those at which corona is generated in the gaseous medium, the semiconducting members composed of a fibrous base material, one part of resin binder and from about one to three parts of finely divided natural anthracite coal having less than 10% volatile matter applied to the fibrous base material.

9. In high voltage electrical apparatus operating in a gaseous medium, a plurality of end winding electrical members, electrical insulation applied to the electrical members, a high resistance coating having a resistivity of the order of 1 megohm and higher applied to the exterior of the electrical insulation to grade the potential on each electrical member to a value below that at which corona is generated in the gaseous medium, spacing means for spacing the electrical members with respect to one another in the gaseous medium, the spacing means including semiconducting members of semi-conducting nature throughout and having a resistance of from 0.001 to 10 megohms per cubic inch, the semi-conducting members so applied in contact with the high resistance coating on at least two electrical members that the potential gradient between the electrical members is graded to a value below that at which corona is generated in the gaseous medium, the semi-conducting members composed mainly of about one part by weight of a resinous binder and from about one to three parts of finely divided natural anthracite coal containing less than 10% of volatile matter distributed in the resinous binder.

10. A solid semiconducting member comprising in combination, sheets of fibrous material composed of asbestos, a phenol-formaldehyde resin applied to the asbestos fibrous material to bond the sheets into the member and natural anthracite coal having less than 10% volatile matter and of colloidal fineness distributed throughout the phenol-aldehyde resin, from 85 to 10 parts by weight of the resin being combined with from 15 to 90 parts by weight of the anthracite coal to provide for an electrical resistance of the order of 0.001 to 10 megohms per cubic inch.

WILLIAM B. ATKINSON.
LAWRENCE R. HILL.
HARRY H. BARKER.

REFERENCES CITED

The following references are of record in the file of this patent:

UNITED STATES PATENTS

| Number | Name | Date |
| --- | --- | --- |
| 2,042,208 | Calvert | May 26, 1936 |
| 653,468 | Burke | July 10, 1900 |
| 2,234,068 | Wiseman | Mar. 4, 1941 |
| 2,019,297 | Faucett | Oct. 29, 1935 |
| 2,211,584 | Ruben | Aug. 13, 1940 |
| 2,282,832 | Spooner | May 12, 1942 |
| 1,784,989 | Hill | Dec. 16, 1930 |
| 2,134,795 | Meyers | Nov. 1, 1938 |

FOREIGN PATENTS

| Number | Country | Date |
| --- | --- | --- |
| 261,816 | Great Britain | Nov. 29, 1926 |